Patented May 11, 1943

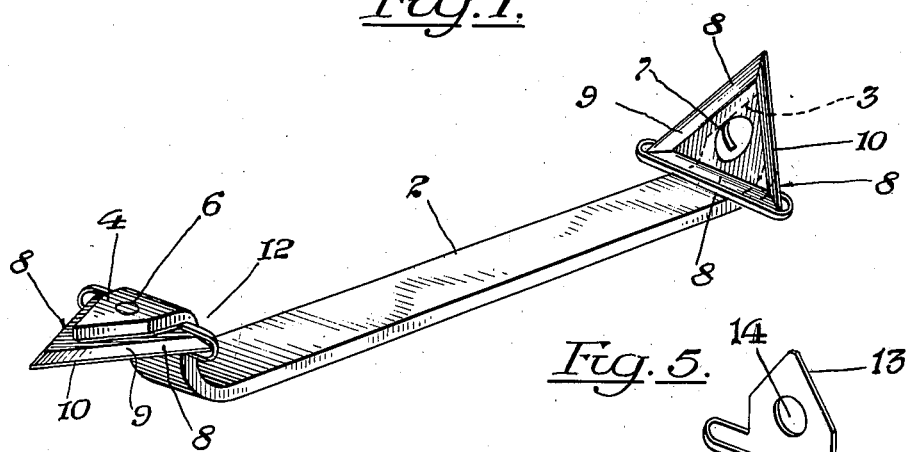
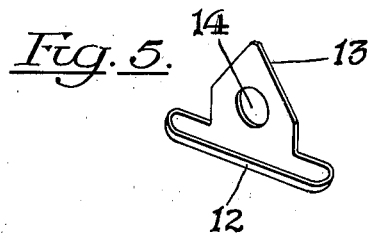
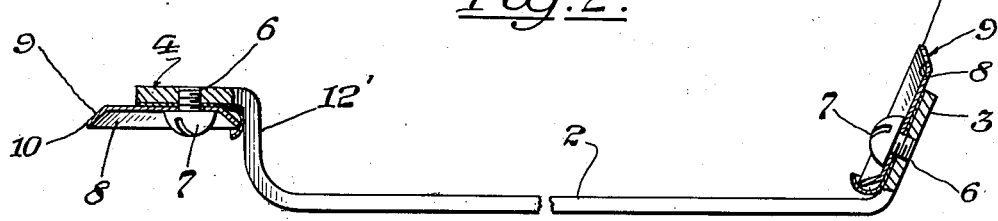
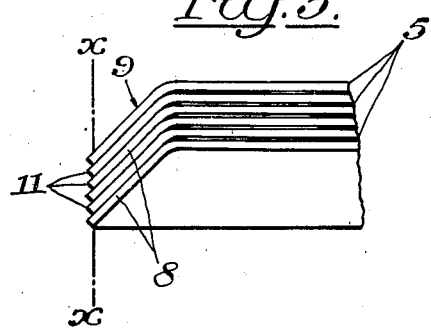
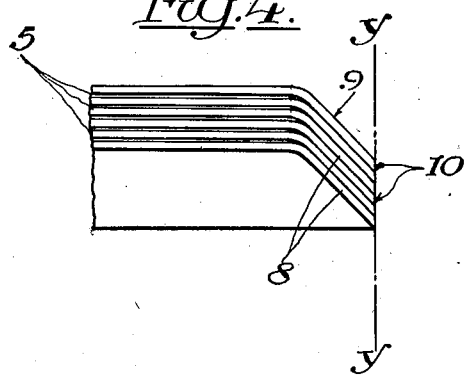

2,318,585

UNITED STATES PATENT OFFICE 2,318,585

SCRAPING TOOL

Alfred W. Abrahamsen, Hempstead, N. Y.

Application March 6, 1939, Serial No. 260,026

21 Claims. (Cl. 30—171)

This invention relates to scraping tools particularly adapted for cleaning out cracks in plastered walls preparatory to refilling the same in readiness for the application of a new decorative finish to the wall and has for its principal object the provision of a simple, inexpensive and efficient tool capable of producing the desired result in an expeditious manner.

Heretofore, in preparing for the redecoration of plastered walls, the cracks in the plaster, due to the settling of the house or other causes, it has been necessary to clean out each crack a sufficient width to permit the proper refilling of the crack so as to obtain a smooth surface and this has usually been done by the use of a putty knife which is tedious and unsatisfactory and it is the object of the present invention, therefore, to provide a more efficient tool for this purpose.

A further object of the present invention is the provision of a tool of the class described in which the cutting blades are shiftable into different positions to increase the life of the blade and also removable, and in which the tool as a whole is reversible from end to end so that it may be used when working from above with a downward stroke or from below with an upward stroke.

An important object of the present invention is the provision of cutter blades so constructed that they may be nested and thus permit the grinding of a series of nested blades at one and the same time, thus insuring the same efficient cutting edge to all, while each blade will have a strong heel or back to support the cutting edge, thus permitting numerous sharpenings.

A further object of the invention is the provision of improved sheet metal blades so formed that they may be readily nested to insure the proper sharpening thereof at a ninety degree angle to the back face of the blade.

In the drawing accompanying and forming a part of this specification,

Fig. 1 is a perspective view of this improved scraper.

Fig. 2 is a side view thereof partly in section.

Fig. 3 is a sectional view of a plurality of cutter blades in nested form before the edges have been ground along the line X—X.

Fig. 4 is a similar view illustrating the edges ground along the line Y—Y, and

Fig. 5 is a perspective view of the edge guard detached.

Similar characters of reference indicate corresponding parts in the several views.

Before explaining in detail the present improvement and mode of operation thereof, I desire to have it understood that the invention is not limited to the details of construction and arrangement of parts illustrated in the accompanying drawing since the invention is capable of other embodiments and that the phraseology employed is for the purpose of description and not of limitation.

The present improvement comprises a handle 2 having one end 3 bent at an angle and the opposite end bent substantially at right angles so as to form a goose neck 4 whereby the free end is substantially parallel with the main portion 2, and substantially in the plane of the point of the bent end 3. Thus, the handle with its bent ends may properly be termed a U-shaped handle terminating in two triangular portions of an area properly to receive and support the triangular blades hereinafter described and so formed as interchangeably to receive the blades.

Each of these bent ends 3 and 4 is provided with an opening 6 for a screw 7 for clamping a blade 8 to the handle with the blade under the bent ends thereof, whereby the blades are located on opposite faces of the handle and the angle of the bent portions 3 and 4 with relation to the handle 2, in addition to enabling the user to cut with either a downward or an upward stroke, also serves properly to position the blade against rotative movement should the screw 7 not be sufficiently tightened.

Each blade 8 is shown of triangular form and comprises a flat supporting surface for a back or heel 5 and skirts 9 bent that is, drawn or stamped at approximately forty-five degrees to the back. The blades may be readily stamped out of sheet metal and the cutting edges 10 are formed by grinding the exterior edge 11 (Fig. 3) at right angles to the face or back 5 of the blades and, therefore, substantially at forty-five degrees to the skirt 9 thereof.

By forming the skirts at substantially a forty-five degree angle, the triple result is obtained of permitting a multiplicity of blades to be nested readily and ground at the same time with their edges square or at a ninety degree angle to the back or heel as illustrated in Figs. 3 and 4, thereby reducing the cost of manufacture since, otherwise, it would be necessary to grind the edges of each blade separately which would also be necessary if any other grinding angle were used; also for the purpose of giving the cutting edge as much backing as possible to provide the blades with durability and strength and permit the scrapers to be resharpened until there is nothing left of the skirts and yet at all times retain their strength and a superior cutting edge. In order to give the user or customer a more readily manipulated tool, the handle is made as a flat bar about ¾" wide with the triangular faces of the bent ends about 1" in depth so that the ends form substantially a 60 degree triangle. This determines to a considerable extent the size of the cutter that can be used for, in order that the cutters have as much backing as possible to insure durability and strength in the blades, it is essential that the cutters have as large a base or back as possible. Consequently, the area of the base of the cutters corresponds substantially to the area of the triangular ends of the handle which, it will be observed, overlap the cutter backs to receive the strain thereon while, at the same time, the relatively large area of the back of the cutters results in having the cutting skirt portions of the cutters as wide as possible to permit frequent regrinding and yet this skirt portion is of minimum or shallow width to prevent vibration and chattering since the closer the cutting edge is to the back of the cutter, the less vibration and chattering. Therefore, the cutting flanges or skirts are relatively narrow as compared with the back and to accomplish these not only important but essential features, the back or base of the cutter is materially larger than each cutting portion or skirt of a blade and is not only of substantially the area of the triangular ends 3 and 6, but of the entire triangularly formed skirts, thus insuring that the cutters are properly supported under strain with a minimum of vibration and chattering. Furthermore, since both triangular ends of the handle are alike and since the blades are all formed alike so that they can be nested and ground alike, it follows that any blade will fit either end of the handle and can be interchangeably used at both ends of the handle.

In the use of the tool, the blade at the end 3 is employed when a downward stroke is desired, the bent portion 12' of the handle at the opposite end serving as a rest for the hand to permit the necessary pull without slipping of the hand along the handle. When an upward stroke is required, as when a crack is to be opened from the floor upward, the goose neck end 4 is used. This also permits the operator to exert a pull from behind the blade and also allows the blade to center and adjust itself to the crank, resulting in a clean cut being made.

In the manipulation of this tool, when the workman uses the end bent at an angle to the handle, that is, the end 3, the natural result of pulling the scraper along the crack is to drag the cutter at a point behind his hand which causes the point to follow the crack rather than to leave it, which would be the case if the cutter was in the crack in front of his hand. Furthermore, one purpose of the goose neck, the end 4, is to give the cutter a shoulder to rest on to keep it from turning but the excessive depth of the goose neck is to cause this same dragging effect with that end also. Thus, the handle is so shaped as to secure this dragging effect when either end of the tool is used.

Should one of the points become worn, the blade may be readily shifted by releasing the clamping screw 7 to bring another point in front and when the blade becomes dull or completely worn out by repeated grindings, it can be readily removed and replaced by another having the same sharpened edge. Thus, a very simple and inexpensive tool is provided and the workman is always sure that the cutting edge is ground to its maximum keenness since it is only necessary to regrind it at a ninety degree angle to the back, requiring no expert manipulation of the file or other grinding means while, at the same time, all of the blades furnished with the tool may be used and then all reground at the same time.

To prevent the edge of the blade 8 adjacent to the handle from cutting the hand of the user, a suitable guard (see Fig. 5) is provided for each end 3 and 4 and comprises a channel portion 12 in which the blade is seated and a flange 13 having a suitable opening 14 for attachment to the ends 3 and 4 by means of the screw 7.

It is to be understood that, by describing in detail herein any particular form, structure or arrangement, it is not intended to limit the invention beyond the terms of the several claims or the requirements of the prior art.

Having thus explained the nature of my said invention and described a way of constructing and using the same although without attempting to set forth all of the forms in which it may be made or all of the modes of its use, I claim:

1. A plaster crack cleaning tool comprising a handle having its end bent at an angle to the handle, a blade secured to the angularly bent end and comprising a back and a triangular-shaped skirt formed at an angle to the back with its free edge ground at an angle to the back, the triangular point of the blade in position for use projecting beyond the handle and substantially coinciding with the lengthwise axis of the bent end of the handle, the area of the back being materially greater than any one side of the triangular skirt whereby the width of each skirt is relatively narrow as compared with its back so that chattering and vibration are prevented.

2. The plaster crack cleaning tool of claim 1 in which the blade has one of its skirts in proximity to a flat side of the handle to prevent turning of the blade in use.

3. The plaster crack cleaning tool of claim 1 in which a guard is located between one skirt of the blade and the handle.

4. The plaster crack cleaning tool of claim 1 in which the bent end of the handle substantially conforms to the triangular shape of the blade.

5. The plaster crack cleaning tool of claim 1 in which the bent end of the handle substantially conforms to the triangular shape of the blade, and a guard having a part also substantially conforming to the triangular shape of the blade is located between a skirt of the blade and the handle and secured between the blade and handle.

6. A plaster crack cleaning tool comprising a handle having a triangularly formed end bent at an angle to the handle, a triangular blade secured flatwise to the triangularly bent end of the handle and comprising a back having an area substantially coinciding with said triangular end of the handle and provided with a triangularly shaped skirt bent at an angle to the back with its edge ground at an angle to the back, a triangular point of the blade projecting beyond and substantially in line with a triangular point of the handle, with one of the longer edges of the blade in juxtaposition to the handle to prevent turning of the blade in use.

7. A plaster crack cleaning tool comprising a handle terminating at its end in a triangularly shaped end located at an angle to the handle and forming at one end substantially a gooseneck, the gooseneck end of the handle providing a rest for the hand, and a triangularly shaped blade secured to the triangularly shaped end and comprising a back having a triangularly shaped shallow skirt bent at an angle to its back and having its free edge ground at an angle to the back, the point of the blade in position for use projecting from the handle substantially in line with the point of the handle.

8. The plaster crack cleaning tool of claim 7 in which the bent end of the handle overlaps the blade to receive the strain on the blade in use.

9. The plaster crack cleaning tool of claim 7 in which the triangularly shaped skirt of the blade is located at an angle of approximately 45 degrees to the back with its free edge ground at an angle of approximately 90 degrees to the back.

10. The plaster crack cleaning tool of claim 7 in which the back of the blade has an area substantially coinciding with a triangular end of the handle.

11. The plaster crack cleaning tool of claim 7 in which the area of the back is greater than any side of the triangularly bent skirt.

12. The plaster crack cleaning tool of claim 7 in which the area of the back is approximately the area of the entire triangularly bent skirts.

13. The plaster crack cleaning tool of claim 7 in which the triangular blade is a duplicate of other blades and, therefore, adapted to be nested and simultaneously ground therewith.

14. The plaster crack cleaning tool of claim 7 in which the blade is shiftable on its handle to bring any one of its three points into position for use and is also removable from the handle.

15. The plaster crack cleaning tool of claim 7 in which the blade has one skirt thereof in proximity to a flat side of the handle to prevent turning of the blade in use.

16. The plaster crack cleaning tool of claim 7 in which the bent end of the handle overlaps the blade to receive the strain on the handle in use and in which a guard is located between a skirt of the blade and the handle.

17. The plaster crack cleaning tool of claim 7 in which the bent end of the handle overlaps the blade to receive the strain on the handle in use and in which a guard is located between a skirt of the blade and the handle, said guard having a part substantially conforming to the triangular shape of the blade.

18. The plaster crack cleaning tool of claim 1 in which the bent end of the handle is formed as a 60-degree triangle and in which the triangularly shaped skirt of the blade is at an angle of approximately 45 degrees to its back with its free edge ground at an angle of approximately 90 degrees to its back.

19. A plaster crack cleaning tool comprising a stamped sheet metal blade having a triangular back and therearound and at an angle thereto a triangular skirt having a cutting edge formed at a 90 degree angle to the back, the back having an area materially greater than any one side of the triangular skirt whereby each triangular skirt is relatively narrow as compared with the back, the cutting edges of the blade adapted to be ground when the blade is nested with a plurality of similar blades.

20. The plaster crack cleaning tool of claim 19 in which the angle of the skirt is substantially 45 degrees to the back and the ground cutting edge is substantially at 45 degrees to the skirt.

21. A plaster crack cleaning tool comprising a handle having a triangularly formed end extending at an angle to the handle and a triangularly formed blade comprising a back having a triangularly formed shallow skirt located at a predetermined angle to the back with its cutting edge ground at a predetermined angle to the back, the blade so shaped as to fit the triangular end of the handle and also interchangeable with similar blades the point of the blade in position for use projecting beyond the handle and substantially coinciding with the point of the triangular end of the handle.

ALFRED W. ABRAHAMSEN.